United States Patent
Shinde et al.

(10) Patent No.: US 8,971,164 B2
(45) Date of Patent: Mar. 3, 2015

(54) OPTICAL PICK-UP DEVICE AND OPTICAL COMPONENT FOR THE SAME

(75) Inventors: Kenichi Shinde, Tokyo (JP); Akira Komori, Tochigi (JP); Kazuya Arakawa, Gunma (JP)

(73) Assignee: Hoya Corporation, Tokyo (JP)

( * ) Notice: Subject to any disclaimer, the term of this patent is extended or adjusted under 35 U.S.C. 154(b) by 105 days.

(21) Appl. No.: 13/595,159

(22) Filed: Aug. 27, 2012

(65) Prior Publication Data

US 2013/0051208 A1 Feb. 28, 2013

(30) Foreign Application Priority Data

Aug. 31, 2011 (JP) ................................. 2011-188670

(51) Int. Cl.
*G11B 7/1372* (2012.01)
*G11B 7/1392* (2012.01)

(52) U.S. Cl.
CPC ............ *G02B 1/115* (2013.01); *G11B 7/13922* (2013.01); *G11B 7/1372* (2013.01)
USPC ..................................... 369/112.25; 359/581

(58) Field of Classification Search
None
See application file for complete search history.

(56) References Cited

U.S. PATENT DOCUMENTS

| 5,725,959 A | 3/1998 | Terada et al. |
| 2005/0219683 A1 | 10/2005 | Ohta et al. |
| 2007/0230311 A1* | 10/2007 | Kawakita et al. ........ 369/112.25 |
| 2011/0075541 A1 | 3/2011 | Inoue et al. |
| 2011/0075542 A1 | 3/2011 | Inoue et al. |
| 2011/0103217 A1 | 5/2011 | Inoue et al. |

FOREIGN PATENT DOCUMENTS

| JP | 6-273601 | 9/1994 |
| JP | 2005-317186 | 11/2005 |
| JP | 2006-228285 | 8/2006 |
| JP | 2011-96352 | 5/2011 |
| JP | 2011-119011 | 6/2011 |
| JP | 2012-48802 | 3/2012 |

* cited by examiner

*Primary Examiner* — Wayne Young
*Assistant Examiner* — Brian Butcher
(74) *Attorney, Agent, or Firm* — Greenblum & Bernstein, P.L.C.

(57) ABSTRACT

An optical component for an optical pick-up for converging a laser beam having a particular wavelength onto a recording layer of an optical disc. The optical component comprises a base material formed of a resin composition, an undercoating which is formed of three layers of thin films having a same main constituent and is formed on a top surface of the base material, and a functional thin film formed on a top surface of the undercoating. In this configuration, each of a first layer and a third layer of the undercoating is a thin film formed without introducing oxygen, and a second layer is a thin film formed while introducing oxygen. A film thickness of the undercoating falls within a range of 160 nm to 270 nm, and film thicknesses of the thin films constituting the undercoating are substantially equal to each other.

28 Claims, 2 Drawing Sheets

OPTICAL PICK-UP DEVICE AND OPTICAL COMPONENT FOR THE SAME

BACKGROUND OF THE INVENTION

The present invention relates to an optical pick-up device and an optical component for the optical pick-up device suitable for recording information to and/or reproducing information from an optical disc based on a predetermined standard. In particular, the present invention relates to an optical component configured by forming an undercoating and a functional thin film on a base material, and to an optical pick-up device on which the optical component is mounted.

There exist various standards of optical discs, such as CD (Compact Disc), DVD (Digital Versatile Disc) and BD (Blu-ray Disc), differing in recording density, protective layer thickness, etc. An optical pick-up device on which an optical component, such as an objective lens or a collimator lens, is mounted is used to irradiate an information recording layer of an optical disc with a laser beam, and thereby to record information to and/or reproduce information from the optical disc.

There is a case where, when the information recording or information reproducing is performed by the optical pick-up device, unwanted reflected light or scattered light caused on optical surfaces of the optical pick-up device interferes with signal light, and thereby deteriorates a signal to be recorded or to be reproduced. Therefore, in many cases, a functional thin film, such as an antireflection coating or an antistatic film for preventing adhesion of dust, is provided on an optical surface of the optical component.

When assembling the optical pick-up device, dust or a finger mark adhered to the surface of the optical component is wiped out with a solvent. Accordingly, the functional thin film (e.g., an antireflection coating) is required to have abrasion resistance and chemical resistance as well as adhesiveness to the base material. Japanese Patent Provisional Publication No. HEI 6-273601A (hereafter, referred to as patent document 1) discloses technique in which a thin film formed with silicon oxide as a major component to have a predetermined film thickness is used as undercoating of an antireflection coating. Japanese Patent Provisional Publication No. 2006-228285A (hereafter, referred to as patent document 2) discloses technique in which thin films having silicon oxide as a major component and having different refractive indexes are alternately laminated to enhance the light resistance, and the laminated thin films are used as undercoating of the antireflection coating.

SUMMARY OF THE INVENTION

From the viewpoint of the abrasion resistance and chemical resistance, it is effective to increase the film thickness of the undercoating. However, there is a problem that lifting of a film occurs after film formation if the film thickness of the undercoating is increased.

The undercoating disclosed in patent documents 1 and 2 aims to solve such a problem. However, if we try to obtain notable advantages, the film thickness of 300 nm or more is needed. In this case, if the undercoating having such a film thickness is formed on the resin base material, significant deterioration is caused in regard to environmental resistance (e.g., occurrence of crack or abruption under a high temperature condition).

The present invention is advantageous in that it provides an optical component which is capable of having abrasion resistance and chemical resistance (solvent resistance) as well as environmental resistance, and an optical pick-up device on which the optical component is mounted.

According to an aspect of the invention, there is provided an optical component for an optical pick-up for converging a laser beam having a particular wavelength onto a recording layer of an optical disc. The optical component comprises a base material formed of a resin composition, an undercoating which is formed of three layers of thin films having a same main constituent and is formed on a top surface of the base material, and a functional thin film formed on a top surface of the undercoating. In this configuration, each of a first layer and a third layer of the undercoating is a thin film formed without introducing oxygen, and a second layer is a thin film formed while introducing oxygen. A film thickness of the undercoating falls within a range of 160 nm to 270 nm, and film thicknesses of the thin films constituting the undercoating are substantially equal to each other.

Since, according to the above described configuration, the film thickness of the undercoating can be decreased, it becomes possible to enhance the environmental resistance while maintaining the abrasion resistance and the chemical resistance (solvent resistance).

According to another aspect of the invention, there is provided an optical component for an optical pick-up for converging a laser beam having a particular wavelength onto a recording layer of an optical disc. The optical component comprises a base material formed of a resin composition, an undercoating which is formed of three layers of thin films having a same main constituent and is formed on a top surface of the base material, and a functional thin film formed on a top surface of the undercoating. In this configuration, each of a first layer and a third layer of the undercoating is a thin film formed without introducing oxygen, and a second layer is a thin film formed while introducing oxygen. A film thickness of the undercoating falls within a range of 120 nm to 270 nm, and a film thickness of the thin film of the second layer falls within a range of 90 nm to 240 nm.

With this configuration, an optical component having abrasion resistance and chemical resistance (solvent resistance) as well as environmental resistance can be provided.

In at least one aspect, film thicknesses of the first and third layers may be different from each other.

According to another aspect of the invention, there is provided an optical component for an optical pick-up for converging a laser beam having a particular wavelength onto a recording layer of an optical disc. The optical component comprises a base material formed of a resin composition, an undercoating which is formed of five layers of thin films having a same main constituent and is formed on a top surface of the base material, and a functional thin film formed on a top surface of the undercoating. In this configuration, each of a first layer, a third layer and a fifth layer of the undercoating is a thin film formed without introducing oxygen, and each of a second layer and a fourth layer is a thin film formed while introducing oxygen. A film thickness of the undercoating falls within a range of 150 nm to 275 nm, and film thicknesses of the thin films constituting the undercoating are substantially equal to each other.

With this configuration, an optical component having abrasion resistance and chemical resistance (solvent resistance) as well as environmental resistance can be provided.

According to another aspect of the invention, there is provided an optical component for an optical pick-up for converging a laser beam having a particular wavelength onto a recording layer of an optical disc. The optical component comprises a base material formed of a resin composition, an undercoating which is formed of five layers of thin films having a same main constituent and is formed on a top surface of the base material, and a functional thin film formed on a top surface of the undercoating. In this configuration, each of a first layer, a third layer and a fifth layer of the undercoating is a thin film formed without introducing oxygen, and each of a second layer and a fourth layer is a thin film formed while introducing oxygen. A film thickness of the undercoating falls within a range of 125 nm to 290 nm, and an average film thickness of the thin films of the second layer and the fourth layer falls within a range of 30 nm to 120 nm.

With this configuration, an optical component having abrasion resistance and chemical resistance (solvent resistance) as well as environmental resistance can be provided.

In at least one aspect, film thicknesses of the first, third and fifth layers may be different from each other.

In at least one aspect, film thicknesses of the thin films of the second and fourth layers may be different from each other.

In at least one aspect, the thin film formed while introducing oxygen may be a thin film formed by introducing oxygen at a flow rate of $0.7 \times 10^{-2}$ Pa to $3.0 \times 10^{-2}$ Pa.

In at least one aspect, the undercoating may comprise a thin film including metal oxide as the same main constituent.

In at least one aspect, the metal oxide may be silicon oxide.

In at least one aspect, the base material may be made of cycloolefin resin.

In at least one aspect, the functional thin film may be an antireflection coating. In this case, the antireflection coating may comprise a thin film of alumina and a thin film of a mixture of silicon oxide and aluminum.

According to another aspect of the invention, there is provided an optical component for an optical pick-up for converging a laser beam having a particular wavelength onto a recording layer of an optical disc. The optical component comprises a base material formed of a resin composition, an undercoating which is formed of three layers of thin films having a same main constituent and is formed on a top surface of the base material, and a functional thin film formed on a top surface of the undercoating. In this configuration, refractive indexes of thin films of a first layer and a third layer are larger than a refractive index of a thin film of a second layer. A film thickness of the undercoating falls within a range of 160 nm to 270 nm, and film thicknesses of the thin films constituting the undercoating are substantially equal to each other.

With this configuration, an optical component having abrasion resistance and chemical resistance (solvent resistance) as well as environmental resistance can be provided.

According to another aspect of the invention, there is provided an optical component for an optical pick-up for converging a laser beam having a particular wavelength onto a recording layer of an optical disc. The optical component comprises a base material formed of a resin composition, an undercoating which is formed of three layers of thin films having a same main constituent and is formed on a top surface of the base material, and a functional thin film formed on a top surface of the undercoating. In this configuration, refractive indexes of thin films of a first layer and a third layer are larger than a refractive index of a thin film of a second layer. A film thickness of the undercoating falls within a range of 120 nm to 270 nm, and a film thickness of the thin film of the second layer falls within a range of 90 nm to 240 nm.

With this configuration, an optical component having abrasion resistance and chemical resistance (solvent resistance) as well as environmental resistance can be provided.

In at least one aspect, film thicknesses of the first and third layers may be different from each other.

In at least one aspect, a refractive index of the functional thin film is larger than the refractive indexes of the thin films of the first layer and the third layer.

In at least one aspect, the thin film of the second layer may be a thin film formed by introducing oxygen at a flow rate of $0.7 \times 10^{-2}$ Pa to $3.0 \times 10^{-2}$ Pa.

According to another aspect of the invention, there is provided an optical component for an optical pick-up for converging a laser beam having a particular wavelength onto a recording layer of an optical disc. The optical component comprises a base material formed of a resin composition, an undercoating which is formed of five layers of thin films having a same main constituent and is formed on a top surface of the base material, and a functional thin film formed on a top surface of the undercoating. In this configuration, refractive indexes of thin films of a first layer, a third layer and a fifth are larger than refractive indexes of thin films of a second layer and a fourth layer. A film thickness of the undercoating falls within a range of 150 nm to 275 nm, and film thicknesses of the thin films constituting the undercoating are substantially equal to each other.

With this configuration, an optical component having abrasion resistance and chemical resistance (solvent resistance) as well as environmental resistance can be provided.

According to another aspect of the invention, there is provided an optical component for an optical pick-up for converging a laser beam having a particular wavelength onto a recording layer of an optical disc. The optical component comprises a base material formed of a resin composition, an undercoating which is formed of five layers of thin films having a same main constituent and is formed on a top surface of the base material, and a functional thin film formed on a top surface of the undercoating. In this configuration, refractive indexes of thin films of a first layer, a third layer and a fifth are larger than refractive indexes of thin films of a second layer and a fourth layer. A film thickness of the undercoating falls within a range of 125 nm to 290 nm, and an average film thickness of the thin films of the second layer and the fourth layer falls within a range of 30 nm to 120 nm.

With this configuration, an optical component having abrasion resistance and chemical resistance (solvent resistance) as well as environmental resistance can be provided.

In at least one aspect, film thicknesses of the first, third and fifth layers may be different from each other.

In at least one aspect, film thicknesses of the second and fourth layers may be different from each other.

In at least one aspect, a refractive index of the functional thin film may be larger than the refractive indexes of the first, third and fifth layers.

In at least one aspect, the thin films of the second and fourth layers may be thin films formed by introducing oxygen at a flow rate of $0.7 \times 10^{-2}$ Pa to $3.0 \times 10^{-2}$ Pa.

In at least one aspect, the undercoating may comprise a thin film including metal oxide as the same main constituent.

In at least one aspect, the metal oxide may be silicon oxide.

According to another aspect of the invention, there is provided an optical pick-up device, which comprises one of the above described optical components, and a light source that emits, toward the optical component, monochromatic light having a particular wavelength falling within a range of 400 to 410 nm.

With this configuration, an optical pick-up device having abrasion resistance and chemical resistance (solvent resistance) as well as environmental resistance can be provided.

BRIEF DESCRIPTION OF THE ACCOMPANYING DRAWINGS

DETAILED DESCRIPTION OF THE EMBODIMENTS

Hereinafter, an optical component for an optical pick-up and an optical pick-up device on which the optical component is mounted according to an embodiment of the invention are described with reference to the accompanying drawings.

Figure 1:
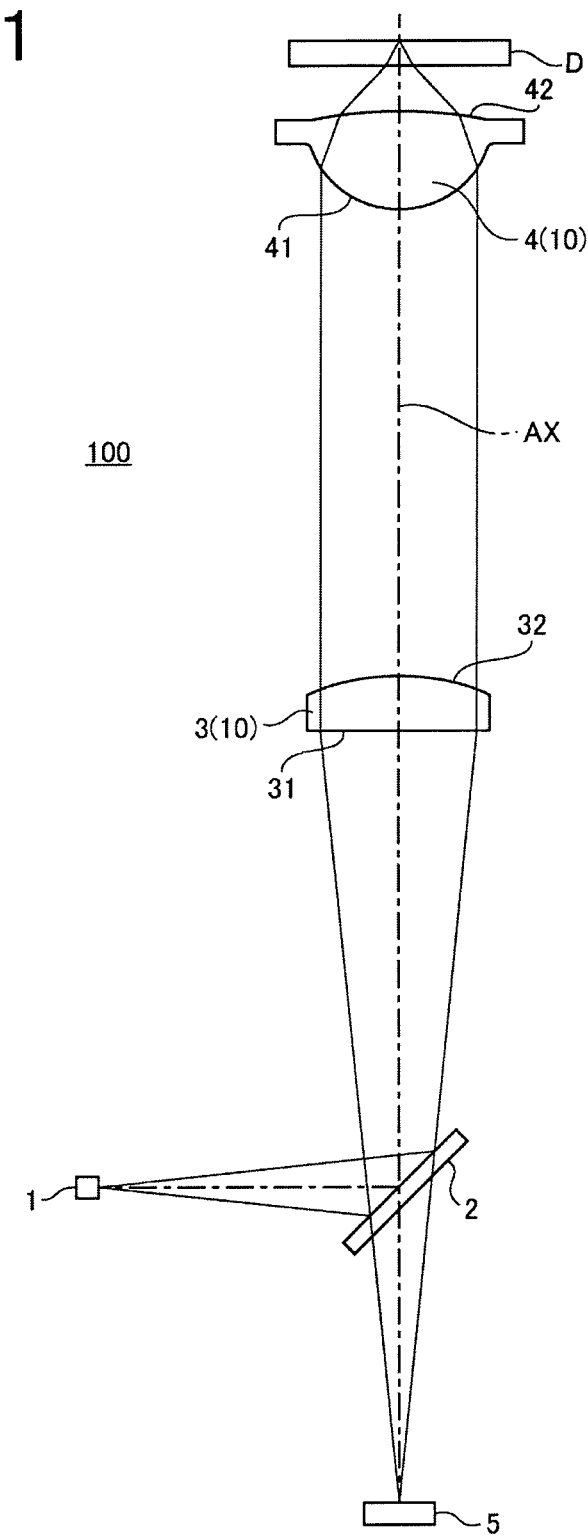
FIG. 1 is a block diagram illustrating a configuration of an optical pick-up optical system according to an embodiment of the invention.

FIG. 1 is a block diagram generally illustrating a configuration of an optical pick-up optical system 100 in which an optical component 10 for an optical pick-up device according to the embodiment is mounted. The optical pick-up device according to the embodiment has the optical pick-up optical system 100 and executes information recording or information reproducing for a high-recording density optical disc (hereafter, referred to as an "optical disc D") based on BD standard.

As shown in FIG. 1, the optical pick-up optical system 100 includes a light source 1, a half mirror 2, a collimator lens 3, an objective lens 4 and a photoreceptor 5. A chain line in FIG. 1 represents a reference axis (optical axis) of the optical pick-up optical system 100. A solid line represents a light beam being incident or reflecting from the optical disc D. In the following, the collimator lens 3 and the objective lens 4 is generally named as an optical component 10 for an optical pick-up.

The optical disc D has a protective layer and a recording surface (not shown). In an actual optical disc D, the recording surface is sandwiched by the protective layer and a substrate layer (or a label layer). The information recording or information reproducing for the optical disc D is performed in a state where a laser beam emitted by the light source 1 impinges on the recording surface of the optical disc being rotated.

The light source 1 is a semiconductor laser which emits blue laser of which design reference wavelength is 405 nm. In general, the oscillation wavelength (unit: nm) of the Fabry-Perot semiconductor laser used for the optical pick-up optical system 100 varies within a range of several nm to several tens nm (e.g., 410 nm to 410 nm) depending on the use environment or the individual differences.

As shown in FIG. 1, the laser beam emitted by the light source 1 is deflected by the half mirror 2 and is incident on the collimator lens 3. The laser beam which has entered the collimator lens 3 is converted by the collimator lens 3 into the collimated beam, and is incident on a first surface 41 of the objective lens 4. The laser beam which has entered the objective lens 4 through the first surface 41 exits from a second surface 42 of the objective lens 4, and is converged at a position close to the recording surface of the optical disc D for which the information recording or information reproducing is performed. The converged laser beam forms a suitable beam spot with a small degree of aberration on the recording surface of the optical disc D. Then, the laser beam reflects from the recording surface of the optical disc D, returns along the same optical path along which the laser beam proceeds toward the optical disc D, and then is received by the photoreceptor 5 after passing through the half mirror 2.

The photoreceptor 5 executes photoelectric transfer for the received laser beam to generate an analog signal, and outputs the analog signal to a signal processing circuit (not shown). The signal processing circuit converts the inputted analog signal into a bit stream, and executes a predetermined error correction process. Then, the signal processing circuit divides the bit stream, for which the error correction has been executed, into streams such as an audio stream and a video stream, and decodes the bit streams. Then, the signal processing circuit converts an audio signal and a video signal obtained by the decoding into analog signals, and outputs the analog signals to a speaker and a display (not shown). As a result, sound and video recorded on the optical disc D are reproduced through the speaker and the display.

In order than the information recording and the information reproducing for the optical disc D can be performed suitably, NA (numerical aperture) on the optical disc D side is determined to fall within the range of 0.8 to 0.87 at the use wavelength $\lambda$.

Each of the collimator lens 3 and the objective lens 4 is a resin lens made of synthetic resin by a know injection molding technology. Since a resin lens is lighter than a glass lens, it becomes possible to decrease the load acting on a lens drive actuator (not shown) by employing a resin lens as the objective lens 4. In addition, resin has a considerably lower transition temperature than glass, and can be molded at a lower temperature. Therefore, a resin lens can be manufactured easier than a glass lens, and an amount of consumption of energy required for manufacturing of a resin lens is small. Furthermore, a resin lens is hard to crack, and treatment of the resin lens is easier. Therefore, a resin lens is suitable for cost reduction by mass production. For the material of the optical component 10, resign whose refractive index n at the use wavelength $\lambda$ falls within a range of 1.4 to 1.7 is selected. As described later, when an optical surface of the optical component 10 is coated with an undercoating 4a or an antireflection film 4b, there is a case where a minute amount f shape change caused by photocatalyst occurs on the coated optical surface of the optical component under a high temperature condition. The shape change of this type occurs frequently when the glass transition temperature Tg of the resin forming the optical component 10 is relatively low (specifically, when Tg is lower than or equal to 115° C.). Therefore, for the material used as the base material of the component 10, resin having Tg larger than 115° C. (preferably, 120° C.) is selected. In this embodiment, for the base material of the collimator lens 3 and the objective lens 4, cycloolefin resin is used. The cycloolefin resin is noncrystalline resin, and has a characteristic that it excels in chemical resistance, has low birefringence, has a low degree of water absorbing property, excels in metal-mold transfer property, and excels in light resistance. Therefore, the cycloolefin resin is suitable for optical components, such as the collimator lens 3 and the objective lens 4.

Figure 2:
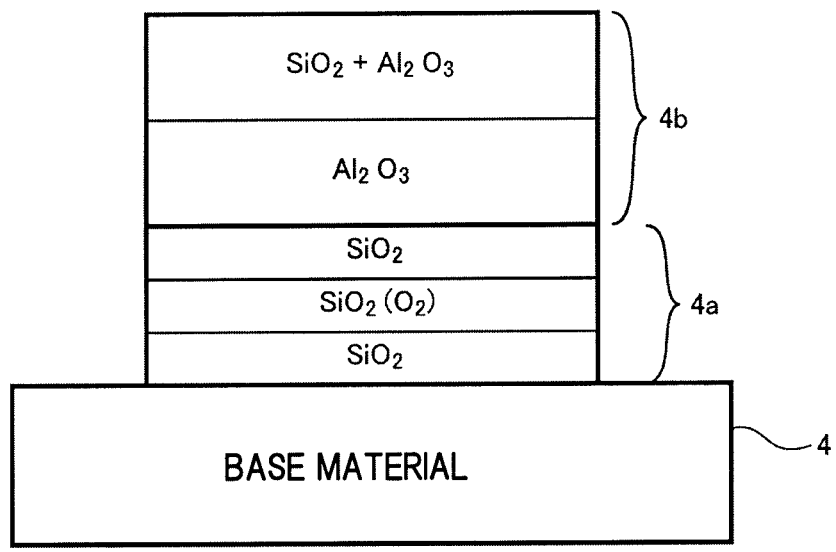
FIG. 2 illustrates a configuration of an undercoating and an antireflection coating according to the embodiment of the invention.

Both surfaces of the collimator lens 3 are coated with the undercoating 4a and the antireflection coating 4b. One of or both of the surfaces of the objective lens 4 is coated with the undercoating 4a and the antireflection coating 4b according to need. FIG. 2 illustrates a configuration of the undercoating 4a and the antireflection coating 4b according to the embodiment.

Each of the undercoating 4a and the antireflection coating 4b with which the optical component 10 is coated is formed with a plurality of layers of dielectric thin films. Each of the undercoating 4a and the antireflection coating 4b is formed by sputtering or vacuum deposition. For materials of the thin films, dielectric materials not including elements, that constitute chemical compounds that induce a photocatalytic reaction, such as Titanium (Ti), Tantalum (Ta), Hafnium (Hf), Zirconium (Zr), Niobium (Nb), Molybdenum (Mo) or Chromium (Cr), are used. If a film (e.g., a titanium oxide film) containing such an element is formed on an optical surface of the optical component 10, chemical change is caused in surrounding resin by activation of the film due to absorption of blue laser by the film under the high temperature environment, and thereby change of properties and deformation due to the change of properties are caused in the resin base material around the optical surface. Since containing the above described element which induces the photocatalytic reaction has a great degree of effect on the deformation or the change of properties of the lens base material around the coated surface, in order to enhance the lifetime of the optical component 10, it is necessary to form the undercoating 4a and the antireflection coating 4b with the material not containing the above described elements.

As shown in FIG. 2, the undercoating 4a according to the embodiment is formed with three layers of thin films each of which is made of silicon oxide which is metal oxide not inducing a photocatalytic reaction. The three layers of the silicon oxide thin films are formed by vacuum deposition. The three layers of the silicon oxide thin films are formed such that a layer formed without introducing oxygen into a chamber of a vacuum deposition apparatus and a layer formed while introducing oxygen into the chamber of the vacuum deposition apparatus are alternately laminated, and the second layer counted from the base material 4 is the thin film of the silicon oxide formed while introducing oxygen into the chamber. The first and third layers counted from the base material 4 of the undercoating 4a are respectively formed of the thin films of the silicon oxide formed without introducing oxygen into the chamber so as to enhance the adhesiveness with respect to the base material 4 and the antireflection coating 4b. As described later, the inventors of the present invention found that, by forming the under coating 4a by alternately laminating the silicon oxide layer formed without introducing oxygen into the chamber and the silicon oxide layer formed while introducing oxygen into the chamber, abrasion resistance, chemical resistance (solvent resistance) and environment resistance of the antireflection coating 4b formed on the top surface of the undercoating 4a can be dramatically enhanced.

As described in detail later, according to the experiment conducted by the inventors, all the antireflection coatings 4b of the optical components 10 (examples 1 to 31 described later) manufactured under a predetermined condition excel in the adhesiveness, abrasion resistance and chemical resistance, and these properties are not damaged largely even in the strict environment condition (e.g., the high temperature condition, low temperature condition or the high humidity/temperature condition). The inventors also found that these advantages arise from the configuration of the thin films of the silicon oxide which constitute the undercoating 4a, and it is extremely effective to form the whole undercoat 4a by an odd number of silicon oxide thin films, to form every odd-numbered layer (i.e., the first layer and the third layer counted from the base material 4) without introducing oxygen into the chamber, and to form every even-numbered layer (i.e., the second layer counted from the base material 4) while introducing oxygen into the chamber.

It is preferable that, for the antireflection coating 4b, the material not inducing the photocatalytic reaction, e.g., silicon oxide, alumina, aluminum fluoride or magnesium fluoride, or a mixture of two or more of these materials (e.g., a mixture of silicon oxide and alumina). In this embodiment, a mixture of silicon oxide and alumina is used. The antireflection coating 4b made of these constituents is formed on the top surface (or both surfaces) of the undercoating 4a of the collimator lens 3 or the objective lens 4. By forming the antireflection coating 4b on both surfaces of the collimator lens 3 or the objective lens 4, decrease of the signal level or occurrence of noise due to unwanted reflection can be effectively reduced. Since, on each of the first and second surfaces 41 and 42 of the objective lens 4, change of the incident angle from the center to the periphery is large, the reflected light from each of the first and second surfaces 41 and 42 diffuses within a wide angle range. Therefore, the effect of the reflected light from the first surface 41 and the second surface 42 with respect to the information recording or the information reproducing for the optical disc D is relatively small. Accordingly, depending on design, it is not necessarily required to provide the antireflection coating 4b on the first surface 41 and the second surface 42 of the objective lens 4.

The antireflection coatings 4b formed on the optical surfaces of the collimator lens 3 and the objective lens 4 may have different configurations. The antireflection coatings 4b having the different configurations may be formed on the respective optical surfaces of the collimator lens 3 and the objective lens 4. For example, the configuration of the antireflection coating 4b may be determined for each of the optical surfaces depending on the power density of blue laser incident on the optical surface or the curvature of the optical surface of the collimator lens 3 or the objective lens 4.

Figure 3:
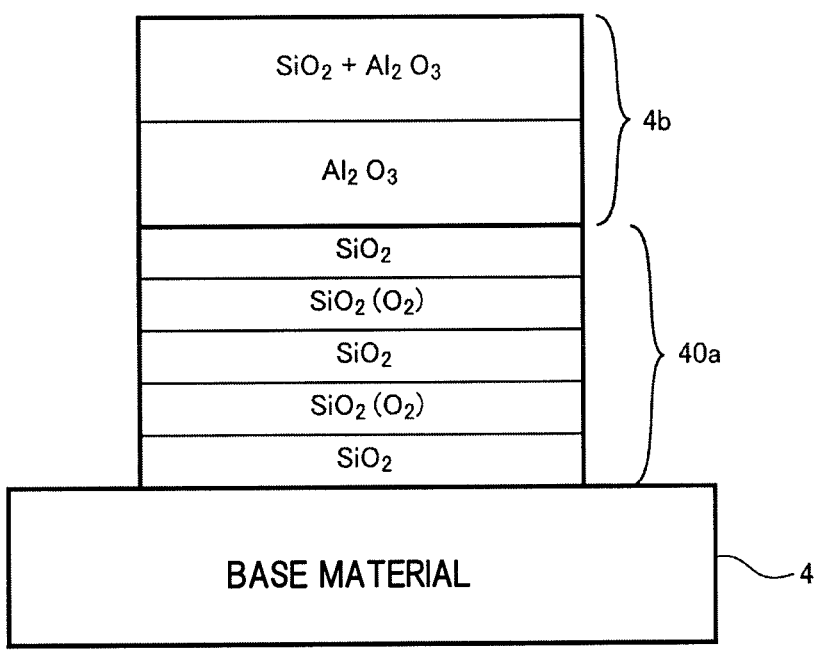
FIG. 3 illustrates a variation of the optical component according to the embodiment of the invention.

The configuration of the undercoating 4a is not limited to the three layer configuration, but may be formed to have in total an odd number of silicon oxide thin films. FIG. 3 illustrates a variation of the undercoating 4a of the embodiment shown in FIG. 2. In this variation, an undercoating 40a is formed of five layers of the silicon oxide thin films. The five layers of the silicon oxide thin films are formed such that a layer formed without introducing oxygen into the chamber and a layer formed while introducing oxygen into the chamber are alternately laminated. The second and fourth layers counted from the base material 4 are the silicon oxide thin films formed without introducing oxygen into the chamber, and the first, third and fifth layers counted from the base material 4 are silicon oxide thin films formed while introducing oxygen into the chamber. By thus forming the undercoating with an odd number of silicon oxide thin films, forming every even-numbed layer while introducing oxygen into the chamber and forming every odd-numbered layer without introducing oxygen into the chamber, abrasion resistance, chemical resistance (solvent resistance) and environmental resistance can be dramatically enhanced as in the case of the above described embodiment.

EXAMPLES

Hereafter, regarding the optical component 10 according to the above described embodiment and the variation, examples and comparative examples are explained in detail.

<Manufacturing Method for Optical Component 10>

Hereafter, manufacturing methods for the optical component 10 according to the examples and the comparative examples are explained. First, a molded part (the base material 4) made of cycloolefin polymer (Zeonex 350R available from ZEON CORPORATION) is manufactured. Then, the undercoating 4a formed of three layers or five layers (the first to fifth layers in the comparative examples) of silicon oxide is deposited on the top surface of the base material 4 with a vacuum deposition apparatus. Excepting the comparative examples 1 to 3 and 9 which are described later, the odd-numbered layers (i.e., the first, third and fifth layers counted from the base material 4 side) of the undercoating 4a are formed to have a predetermined film thickness without introducing oxygen into the chamber of the vacuum deposition apparatus, and the even-numbered layers (i.e., the second and fourth layers counted from the base material 4 side) are formed to have a predetermined film thickness while introducing oxygen at a predetermined flow rate (e.g., $0.7 \times 10^{-2}$ Pa to $3.0 \times 10^{-2}$ Pa) into the chamber of the vacuum deposition apparatus. Next, a thin film of alumina and a thin film of a mixture of silicon oxide and a small amount of aluminum are sequentially deposited on the top surface of the undercoating 4a (40a), so as to form the antireflection coating 4b.

Explanation of Examples and Comparative Examples

Table 1 shows the examples (examples 1 to 31), and shows concrete configurations of the undercoating 4a and the antireflection coating 4b of the optical component 10. Table 2 shows the comparative examples (comparative examples 1 to 12) with respect to the examples 1 to 31. In Tables 1 and 2, each numeric value in the columns of "undercoating" and "antireflection coating" represents the film thickness of each thin film, $SiO_2(1)$ represents the first layer of the thin film counted from the base material 4 side, $SiO_2(2)$ represents the second layer of the thin film counted from the base material 4 side, $SiO_2(3)$ represents the third layer of the thin film counted from the base material 4 side, $SiO_2(4)$ represents the fourth layer of the thin film counted from the base material 4 side, and $SiO_2(5)$ represents the fifth layer of the thin film counted from the base material 4 side. The thin film formed while introducing oxygen into the chamber is represented by "$(O_2)$", and flow rate of oxygen is represented by degree of vacuum (e.g., "1.0E-2 Pa" (i.e., $1.0 \times 10^{-2}$ Pa) or "2.0E-2 Pa" (i.e., $2.0 \times 10^{-2}$ Pa)). "$1.0 \times 10^{-2}$ Pa" corresponds to the flow rate of approximately 25 to 30 sccm (standard cc/min), and "$2.0 \times 10^{-2}$ Pa" corresponds to the flow rate of approximately 65 to 70 sccm. It is known that the flow rate of oxygen has an effect on the refractive index of the silicon oxide thin film. The refractive index of the thin film formed without introducing oxygen is 1.466 ($\lambda o=500$ nm), is 1.456 ($\lambda o=500$ nm) when the degree of vacuum is "$1.0 \times 10^{-2}$ Pa", and is 1.441 ($\lambda o=500$ nm) when the degree of vacuum is "$2.0 \times 10^{-2}$ Pa". That is, by alternately depositing the layer formed without introducing oxygen and the layer formed while introducing oxygen, silicon oxide layers having different refractive indexes are alternately deposited.

TABLE 1

| EXAMPLE No. | BASE MATERIAL | UNDERCOATING | | | | | | ANTIREFLECTION COATING | |
|---|---|---|---|---|---|---|---|---|---|
| | | $SiO_2(1)$ | $SiO_2(2)$ | $SiO_2(3)$ | $SiO_2(4)$ | $SiO_2(5)$ | TOTAL THICKNESS | $Al_2O_3$ | $SiO_2 + Al_2O_3$ |
| 1 | Zeonex 350R | 90 nm | 90 nm (O2) 2.0E-2 Pa | 90 nm | — | — | 270 nm | 67 nm | 69 nm |
| 2 | Zeonex 350R | 65 nm | 65 nm (O2) 1.0E-2 Pa | 65 nm | — | — | 195 nm | 67 nm | 69 nm |
| 3 | Zeonex 350R | 60 nm | 60 nm (O2) 2.0E-2 Pa | 60 nm | — | — | 180 nm | 67 nm | 69 nm |
| 4 | Zeonex 350R | 56.5 nm | 56.5 nm (O2) 2.0E-2 Pa | 56.5 nm | — | — | 170 nm | 67 nm | 69 nm |
| 5 | Zeonex 350R | 53 nm | 53 nm (O2) 2.0E-2 Pa | 53 nm | — | — | 160 nm | 67 nm | 69 nm |
| 6 | Zeonex 350R | 15 nm | 240 nm (O2) 2.0E-2 Pa | 15 nm | — | — | 270 nm | 67 nm | 69 nm |
| 7 | Zeonex 350R | 15 nm | 150 nm (O2) 2.0E-2 Pa | 15 nm | — | — | 180 nm | 67 nm | 69 nm |
| 8 | Zeonex 350R | 15 nm | 120 nm (O2) 2.0E-2 Pa | 15 nm | — | — | 150 nm | 67 nm | 69 nm |
| 9 | Zeonex 350R | 15 nm | 90 nm (O2) 2.0E-2 Pa | 15 nm | — | — | 120 nm | 67 nm | 69 nm |
| 10 | Zeonex 350R | 30 nm | 90 nm (O2) 2.0E-2 Pa | 30 nm | — | — | 150 nm | 67 nm | 69 nm |
| 11 | Zeonex 350R | 45 nm | 90 nm (O2) 2.0E-2 Pa | 45 nm | — | — | 180 nm | 67 nm | 69 nm |
| 12 | Zeonex 350R | 30 nm | 90 nm (O2) 2.0E-2 Pa | 80 nm | — | — | 200 nm | 67 nm | 69 nm |
| 13 | Zeonex 350R | 70 nm | 90 nm (O2) 2.0E-2 Pa | 40 nm | — | — | 200 nm | 67 nm | 69 nm |
| 14 | Zeonex 350R | 40 nm | 40 nm (O2) 0.7E-2 Pa | 40 nm | 40 nm (O2) 0.7E-2 Pa | 40 nm | 200 nm | 67 nm | 69 nm |

TABLE 1-continued

| EXAMPLE No. | BASE MATERIAL | UNDERCOATING | | | | | TOTAL THICKNESS | ANTIREFLECTION COATING | |
|---|---|---|---|---|---|---|---|---|---|
| | | $SiO_2(1)$ | $SiO_2(2)$ | $SiO_2(3)$ | $SiO_2(4)$ | $SiO_2(5)$ | | $Al_2O_3$ | $SiO_2 + Al_2O_3$ |
| 15 | Zeonex 350R | 40 nm | 40 nm (O2) 1.0E−2 Pa | 40 nm | 40 nm (O2) 1.0E−2 Pa | 40 nm | 200 nm | 67 nm | 69 nm |
| 16 | Zeonex 350R | 40 nm | 40 nm (O2) 2.0E−2 Pa | 40 nm | 40 nm (O2) 0.7E−2 Pa | 40 nm | 200 nm | 67 nm | 69 nm |
| 17 | Zeonex 350R | 40 nm | 40 nm (O2) 3.0E−2 Pa | 40 nm | 40 nm (O2) 3.0E−2 Pa | 40 nm | 200 nm | 67 nm | 69 nm |
| 18 | Zeonex 350R | 30 nm | 30 nm (O2) 2.0E−2 Pa | 30 nm | 30 nm (O2) 2.0E−2 Pa | 30 nm | 150 nm | 67 nm | 69 nm |
| 19 | Zeonex 350R | 30 nm | 30 nm (O2) 1.0E−2 Pa | 30 nm | 30 nm (O2) 1.0E−2 Pa | 30 nm | 150 nm | 67 nm | 69 nm |
| 20 | Zeonex 350R | 55 nm | 55 nm (O2) 2.0E−2 Pa | 55 nm | 55 nm (O2) 2.0E−2 Pa | 55 nm | 275 nm | 67 nm | 69 nm |
| 21 | Zeonex 350R | 15 nm | 40 nm (O2) 2.0E−2 Pa | 15 nm | 40 nm (O2) 2.0E−2 Pa | 15 nm | 125 nm | 67 nm | 69 nm |
| 22 | Zeonex 350R | 15 nm | 60 nm (O2) 2.0E−2 Pa | 15 nm | 60 nm (O2) 2.0E−2 Pa | 15 nm | 165 nm | 67 nm | 69 nm |
| 23 | Zeonex 350R | 15 nm | 80 nm (O2) 2.0E−2 Pa | 15 nm | 80 nm (O2) 2.0E−2 Pa | 15 nm | 205 nm | 67 nm | 69 nm |
| 24 | Zeonex 350R | 15 nm | 100 nm (O2) 2.0E−2 Pa | 15 nm | 100 nm (O2) 2.0E−2 Pa | 15 nm | 245 nm | 67 nm | 69 nm |
| 25 | Zeonex 350R | 15 nm | 120 nm (O2) 2.0E−2 Pa | 15 nm | 120 nm (O2) 2.0E−2 Pa | 15 nm | 285 nm | 67 nm | 69 nm |
| 26 | Zeonex 350R | 20 nm | 100 nm (O2) 2.0E−2 Pa | 20 nm | 100 nm (O2) 2.0E−2 Pa | 20 nm | 260 nm | 67 nm | 69 nm |
| 27 | Zeonex 350R | 30 nm | 100 nm (O2) 2.0E−2 Pa | 30 nm | 100 nm (O2) 2.0E−2 Pa | 30 nm | 290 nm | 67 nm | 69 nm |
| 28 | Zeonex 350R | 25 nm | 30 nm (O2) 2.0E−2 Pa | 25 nm | 30 nm (O2) 2.0E−2 Pa | 25 nm | 135 nm | 67 nm | 69 nm |
| 29 | Zeonex 350R | 15 nm | 45 nm (O2) 2.0E−2 Pa | 15 nm | 45 nm (O2) 2.0E−2 Pa | 15 nm | 135 nm | 67 nm | 69 nm |
| 30 | Zeonex 350R | 15 nm | 30 nm (O2) 2.0E−2 Pa | 30 nm | 50 nm (O2) 2.0E−2 Pa | 45 nm | 135 nm | 170 nm | 69 nm |
| 31 | Zeonex 350R | 30 nm | 60 nm (O2) 2.0E−2 Pa | 45 nm | 20 nm (O2) 2.0E−2 Pa | 15 nm | 170 nm | 170 nm | 69 nm |

TABLE 2

| COMPARATIVE EXAMPLE No. | BASE MATERIAL | UNDERCOATING | | | | | TOTAL THICKNESS | ANTIREFLECTION COATING | |
|---|---|---|---|---|---|---|---|---|---|
| | | $SiO_2(1)$ | $SiO_2(2)$ | $SiO_2(3)$ | $SiO_2(4)$ | $SiO_2(5)$ | | $Al_2O_3$ | $SiO_2 + Al_2O_3$ |
| 1 | Zeonex 350R | 50 nm | 50 nm | 50 nm | 50 nm | — | 200 nm | 67 nm | 69 nm |
| 2 | Zeonex 350R | 207 nm (O2) 2.0E−2 Pa | — | — | — | — | 207 nm | 67 nm | 69 nm |
| 3 | Zeonex 350R | 207 nm | — | — | — | — | 207 nm | 67 nm | 69 nm |
| 4 | Zeonex 350R | 50 nm | 50 nm (O2) 2.0E−2 Pa | 50 nm | — | — | 150 nm | 67 nm | 69 nm |

TABLE 2-continued

| COMPARATIVE EXAMPLE No. | BASE MATERIAL | UNDERCOATING | | | | | | ANTIREFLECTION COATING | |
|---|---|---|---|---|---|---|---|---|---|
| | | $SiO_2(1)$ | $SiO_2(2)$ | $SiO_2(3)$ | $SiO_2(4)$ | $SiO_2(5)$ | TOTAL THICKNESS | $Al_2O_3$ | $SiO_2 + Al_2O_3$ |
| 5 | Zeonex 350R | 40 nm | 40 nm (O2) 2.0E−2 Pa | 40 nm | — | — | 120 nm | 67 nm | 69 nm |
| 6 | Zeonex 350R | 15 nm | 70 nm (O2) 2.0E−2 Pa | 15 nm | — | — | 100 nm | 67 nm | 69 nm |
| 7 | Zeonex 350R | 15 nm | 40 nm (O2) 2.0E−2 Pa | 15 nm | — | — | 70 nm | 67 nm | 69 nm |
| 8 | Zeonex 350R | 52.5 nm | 15 nm (O2) 2.0E−2 Pa | 52.5 nm | — | — | 120 nm | 67 nm | 69 nm |
| 9 | Zeonex 350R | 40 nm | 40 nm | 40 nm | 40 nm | 40 nm | 200 nm | 67 nm | 69 nm |
| 10 | Zeonex 350R | 20 nm | 20 nm (O2) 2.0E−2 Pa | 20 nm | 20 nm (O2) 2.0E−2 Pa | 20 nm | 100 nm | 67 nm | 69 nm |
| 11 | Zeonex 350R | 15 nm | 30 nm (O2) 2.0E−2 Pa | 15 nm | 30 nm (O2) 2.0E−2 Pa | 15 nm | 105 nm | 67 nm | 69 nm |
| 12 | Zeonex 350R | 35 nm | 15 nm (O2) 2.0E−2 Pa | 35 nm | 15 nm (O2) 2.0E−2 Pa | 35 nm | 135 nm | 67 nm | 69 nm |

To the optical component 10 according to the examples 1 to 13, the undercoating 4a formed of the three layers of silicon oxide thin films is deposited. Each of the examples 1 to 5 is configured such that the film thicknesses of the thin films constituting the undercoating 4a are substantially the same. Each of the examples 6 to 13 is configured such that the thickness of the odd-numbered layer is smaller than the thickness of the even-numbered layer.

To the optical component 10 according to the examples 14 to 31, the undercoating 40a formed of the five layers of silicon oxide thin films having substantially the same film thickness is deposited. The examples 14 to 20 are configured such that the film thicknesses of the thin films constituting the undercoat 40a are substantially the same, and the examples 21 to 31 are configured such that the average film thickness of the odd-numbered layers is smaller than the average film thickness of the even-numbered layers.

The optical component 10 according to each example is configured such that, on the top surface of the undercoating 4a (40a), the thin film made of alumina having the film thickness of 67 nm and the thin film formed of a mixture of silicon oxide and a small amount of aluminum and having the thickness of 69 nm are sequentially deposited. The antireflection coating 4b is formed of the thin film made of alumina and the thin film formed of the mixture of silicon oxide and a small amount of aluminum, and in the examples and the comparative examples, the antireflection coating 4b formed of the thin film of the alumina having the refractive index of 1.65 (λo=500 nm) and the thin film formed of the mixture of silicon oxide and aluminum having the refractive index of 1.48 (λo=500 nm) is deposited. According to the reliability test, it has been found that if the whole thickness of the undercoating 4a (40a) exceeds 290 nm, crack or abruption occurs in the undercoating 4a and the antireflection coating 4b. Therefore, the whole thickness of the undercoating 4a (40a) is determined to be smaller than or equal to 290 nm. Although, in the film formation by vacuum deposition, control of the film thickness becomes hard if the film thickness becomes smaller than 15 nm, it is possible to further decrease the film thickness of silicon oxide if control of the film thickness is possible.

The undercoating according to the comparative example 1 is configured such that four layers of the silicon oxide thin films each of which is formed without introducing oxygen into the chamber and has the thickness of 50 nm are laminated (i.e., laminated by executing processes four times). The undercoating according to the comparative example 2 is the silicon oxide thin film which is formed while introducing oxygen into the chamber and has the film thickness of 207 nm. The undercoating according to the comparative example 3 is the thin film of silicon oxide which is formed without introducing oxygen into the chamber and has the film thickness of 207 nm. The comparative examples 4 and 5 are comparative examples in which the thicknesses of the thin films of silicon oxide constituting the undercoating are set to be further smaller than those of the example 3. The comparative examples 6 and 7 are comparative examples in which the thickness of the even-numbered layer (i.e., the second layer) is set to be further smaller than that of the example 7. The comparative example 8 is configured such that the thickness of the odd-numbered layer is larger than that of the even-numbered layer (i.e., the average film thickness of the odd-numbered layers is larger than the average film thickness of the even-numbered layers). The comparative example 9 is configured such that the five layers of the silicon oxide thin films each of which is formed without introducing oxygen into the chamber and has the film thickness of 40 nm are laminated (i.e., laminated by executing processes five times). The comparative example 10 is a comparative example in which the film thicknesses of the odd-numbered layer and the even-numbered layer of the undercoating are decreased further relative to the example 18. The comparative example 11 is a comparative example in which the film thickness of the even-numbered layer (i.e., the second layer) is decreased further relative to the example 21. The comparative example 12 is configured such that the film thickness of the odd-numbered layer of the undercoating is larger than the film thickness of the even-numbered layer of the undercoating (i.e., the average film thickness of the odd-numbered layers is larger than the average film thickness of the even-numbered layers).

We conducted the friction and abrasion test and the reliability test described below for the optical component 10 according to the examples and the comparative examples. Table 3 shows results of the friction and abrasion test and the reliability test for the examples (the examples 1 to 31) shown in Table 1. Table 4 shows results of the friction and abrasion test and the reliability test for the comparative examples (the comparative examples 1 to 12) shown in Table 2.

TABLE 3

| EXAMPLE No. | | FRICTION AND ABRASION TEST FRICTION AND ABRASION LOAD (g) (Average) | JUDGMENT | RELIABILITY TEST TEST CONDITION | JUDGMENT | COMPREHENSIVE EVALUATION |
|---|---|---|---|---|---|---|
| 1 | UP SEC. | 500 | ○ | H_TEMP. 85° C. × 168 h | ○ | ○ |
|   | MID SEC. | 500 |   | L_TEMP. −40° C. × 168 h | ○ |   |
|   | LOW SEC. | 500 |   | H_HUM. 60° C. · 90% RH × 168 h | ○ |   |
| 2 | UP SEC. | 500 | ○ | H_TEMP. 85° C. × 168 h | ○ | ○ |
|   | MID SEC. | 500 |   | L_TEMP. −40° C. × 168 h | ○ |   |
|   | LOW SEC. | 500 |   | H_HUM. 60° C. · 90% RH × 168 h | ○ |   |
| 3 | UP SEC. | 125 | Δ | H_TEMP. 85° C. × 168 h | ○ | ○ |
|   | MID SEC. | 225 |   | L_TEMP. −40° C. × 168 h | ○ |   |
|   | LOW SEC. | 225 |   | H_HUM. 60° C. · 90% RH × 168 h | ○ |   |
| 4 | UP SEC. | 375 | ○ | H_TEMP. 85° C. × 168 h | ○ | ○ |
|   | MID SEC. | 375 |   | L_TEMP. −40° C. × 168 h | ○ |   |
|   | LOW SEC. | 300 |   | H_HUM. 60° C. · 90% RH × 168 h | ○ |   |
| 5 | UP SEC. | 150 | Δ | H_TEMP. 85° C. × 168 h | ○ | ○ |
|   | MID SEC. | 225 |   | L_TEMP. −40° C. × 168 h | ○ |   |
|   | LOW SEC. | 225 |   | H_HUM. 60° C. · 90% RH × 168 h | ○ |   |
| 6 | UP SEC. | 500 | ○ | H_TEMP. 85° C. × 168 h | ○ | ○ |
|   | MID SEC. | 500 |   | L_TEMP. −40° C. × 168 h | ○ |   |
|   | LOW SEC. | 500 |   | H_HUM. 60° C. · 90% RH × 168 h | ○ |   |
| 7 | UP SEC. | 500 | ○ | H_TEMP. 85° C. × 168 h | ○ | ○ |
|   | MID SEC. | 450 |   | L_TEMP. −40° C. × 168 h | ○ |   |
|   | LOW SEC. | 500 |   | H_HUM. 60° C. · 90% RH × 168 h | ○ |   |
| 8 | UP SEC. | 400 | ○ | H_TEMP. 85° C. × 168 h | ○ | ○ |
|   | MID SEC. | 400 |   | L_TEMP. −40° C. × 168 h | ○ |   |
|   | LOW SEC. | 375 |   | H_HUM. 60° C. · 90% RH × 168 h | ○ |   |
| 9 | UP SEC. | 175 | Δ | H_TEMP. 85° C. × 168 h | ○ | ○ |
|   | MID SEC. | 325 |   | L_TEMP. −40° C. × 168 h | ○ |   |
|   | LOW SEC. | 225 |   | H_HUM. 60° C. · 90% RH × 168 h | ○ |   |
| 10 | UP SEC. | 350 | ○ | H_TEMP. 85° C. × 168 h | ○ | ○ |
|   | MID SEC. | 500 |   | L_TEMP. −40° C. × 168 h | ○ |   |
|   | LOW SEC. | 450 |   | H_HUM. 60° C. · 90% RH × 168 h | ○ |   |
| 11 | UP SEC. | 350 | ○ | H_TEMP. 85° C. × 168 h | ○ | ○ |
|   | MID SEC. | 400 |   | L_TEMP. −40° C. × 168 h | ○ |   |
|   | LOW SEC. | 400 |   | H_HUM. 60° C. · 90% RH × 168 h | ○ |   |
| 12 | UP SEC. | 450 | ○ | H_TEMP. 85° C. × 168 h | ○ | ○ |
|   | MID SEC. | 500 |   | L_TEMP. −40° C. × 168 h | ○ |   |
|   | LOW SEC. | 450 |   | H_HUM. 60° C. · 90% RH × 168 h | ○ |   |
| 13 | UP SEC. | 500 | ○ | H_TEMP. 85° C. × 168 h | ○ | ○ |
|   | MID SEC. | 450 |   | L_TEMP. −40° C. × 168 h | ○ |   |
|   | LOW SEC. | 500 |   | H_HUM. 60° C. · 90% RH × 168 h | ○ |   |
| 14 | UP SEC. | 500 | ○ | H_TEMP. 85° C. × 168 h | ○ | ○ |
|   | MID SEC. | 275 |   | L_TEMP. −40° C. × 168 h | ○ |   |
|   | LOW SEC. | 400 |   | H_HUM. 60° C. · 90% RH × 168 h | ○ |   |
| 15 | UP SEC. | 400 | ○ | H_TEMP. 85° C. × 168 h | ○ | ○ |
|   | MID SEC. | 500 |   | L_TEMP. −40° C. × 168 h | ○ |   |
|   | LOW SEC. | 450 |   | H_HUM. 60° C. · 90% RH × 168 h | ○ |   |
| 16 | UP SEC. | 500 | ○ | H_TEMP. 85° C. × 168 h | ○ | ○ |
|   | MID SEC. | 500 |   | L_TEMP. −40° C. × 168 h | ○ |   |
|   | LOW SEC. | 500 |   | H_HUM. 60° C. · 90% RH × 168 h | ○ |   |
| 17 | UP SEC. | 425 | ○ | H_TEMP. 85° C. × 168 h | ○ | ○ |
|   | MID SEC. | 500 |   | L_TEMP. −40° C. × 168 h | ○ |   |
|   | LOW SEC. | 500 |   | H_HUM. 60° C. · 90% RH × 168 h | ○ |   |
| 18 | UP SEC. | 400 | ○ | H_TEMP. 85° C. × 168 h | ○ | ○ |
|   | MID SEC. | 500 |   | L_TEMP. −40° C. × 168 h | ○ |   |
|   | LOW SEC. | 250 |   | H_HUM. 60° C. · 90% RH × 168 h | Δ |   |
| 19 | UP SEC. | 500 | ○ | H_TEMP. 85° C. × 168 h | ○ | ○ |
|   | MID SEC. | 450 |   | L_TEMP. −40° C. × 168 h | ○ |   |
|   | LOW SEC. | 350 |   | H_HUM. 60° C. · 90% RH × 168 h | Δ |   |
| 20 | UP SEC. | 500 | ○ | H_TEMP. 85° C. × 168 h | ○ | ○ |
|   | MID SEC. | 500 |   | L_TEMP. −40° C. × 168 h | ○ |   |
|   | LOW SEC. | 500 |   | H_HUM. 60° C. · 90% RH × 168 h | ○ |   |
| 21 | UP SEC. | 300 | ○ | H_TEMP. 85° C. × 168 h | ○ | ○ |
|   | MID SEC. | 400 |   | L_TEMP. −40° C. × 168 h | ○ |   |
|   | LOW SEC. | 350 |   | H_HUM. 60° C. · 90% RH × 168 h | ○ |   |

TABLE 3-continued

| EXAMPLE No. | | FRICTION AND ABRASION LOAD (g) (Average) | JUDGMENT | RELIABILITY TEST TEST CONDITION | JUDGMENT | COMPREHENSIVE EVALUATION |
|---|---|---|---|---|---|---|
| 22 | UP SEC. | 500 | ○ | H_TEMP. 85° C. × 168 h | ○ | ○ |
| | MID SEC. | 450 | | L_TEMP. −40° C. × 168 h | ○ | |
| | LOW SEC. | 500 | | H_HUM. 60° C. · 90% RH × 168 h | ○ | |
| 23 | UP SEC. | 500 | ○ | H_TEMP. 85° C. × 168 h | ○ | ○ |
| | MID SEC. | 500 | | L_TEMP. −40° C. × 168 h | ○ | |
| | LOW SEC. | 500 | | H_HUM. 60° C. · 90% RH × 168 h | ○ | |
| 24 | UP SEC. | 500 | ○ | H_TEMP. 85° C. × 168 h | ○ | ○ |
| | MID SEC. | 500 | | L_TEMP. −40° C. × 168 h | ○ | |
| | LOW SEC. | 500 | | H_HUM. 60° C. · 90% RH × 168 h | ○ | |
| 25 | UP SEC. | 500 | ○ | H_TEMP. 85° C. × 168 h | ○ | ○ |
| | MID SEC. | 500 | | L_TEMP. −40° C. × 168 h | ○ | |
| | LOW SEC. | 500 | | H_HUM. 60° C. · 90% RH × 168 h | ○ | |
| 26 | UP SEC. | 500 | ○ | H_TEMP. 85° C. × 168 h | ○ | ○ |
| | MID SEC. | 500 | | L_TEMP. −40° C. × 168 h | ○ | |
| | LOW SEC. | 500 | | H_HUM. 60° C. · 90% RH × 168 h | ○ | |
| 27 | UP SEC. | 500 | ○ | H_TEMP. 85° C. × 168 h | ○ | ○ |
| | MID SEC. | 500 | | L_TEMP. −40° C. × 168 h | ○ | |
| | LOW SEC. | 500 | | H_HUM. 60° C. · 90% RH × 168 h | ○ | |
| 28 | UP SEC. | 300 | ○ | H_TEMP. 85° C. × 168 h | ○ | ○ |
| | MID SEC. | 250 | | L_TEMP. −40° C. × 168 h | ○ | |
| | LOW SEC. | 400 | | H_HUM. 60° C. · 90% RH × 168 h | ○ | |
| 29 | UP SEC. | 400 | ○ | H_TEMP. 85° C. × 168 h | ○ | ○ |
| | MID SEC. | 400 | | L_TEMP. −40° C. × 168 h | ○ | |
| | LOW SEC. | 450 | | H_HUM. 60° C. · 90% RH × 168 h | ○ | |
| 30 | UP SEC. | 400 | ○ | H_TEMP. 85° C. × 168 h | ○ | ○ |
| | MID SEC. | 450 | | L_TEMP. −40° C. × 168 h | ○ | |
| | LOW SEC. | 400 | | H_HUM. 60° C. · 90% RH × 168 h | ○ | |
| 31 | UP SEC. | 350 | ○ | H_TEMP. 85° C. × 168 h | ○ | ○ |
| | MID SEC. | 500 | | L_TEMP. −40° C. × 168 h | ○ | |
| | LOW SEC. | 400 | | H_HUM. 60° C. · 90% RH × 168 h | ○ | |

UP SEC.: UPPER SECTION
MID SEC.: MIDDLE SECTION
LOW SEC.: LOWER SECTION
H_TEMP.: HIGH TEMPERATURE
L_TEMP.: LOW TEMPERATURE
H_HUM.: HIGH HUMIDITY

TABLE 4

| COMPARATIVE EXAMPLE No. | | FRICTION AND ABRASION LOAD (g) (Average) | JUDGMENT | RELIABILITY TEST TEST CONDITION | JUDGMENT | COMPREHENSIVE EVALUATION |
|---|---|---|---|---|---|---|
| 1 | UP SEC. | 163 | X | H_TEMP. 85° C. × 168 h | ○ | X |
| | MID SEC. | 169 | | L_TEMP. −40° C. × 168 h | ○ | |
| | LOW SEC. | 106 | | H_HUM. 60° C. · 90% RH × 168 h | Δ | |
| 2 | UP SEC. | 25 | X | H_TEMP. 85° C. × 168 h | ○ | X |
| | MID SEC. | 19 | | L_TEMP. −40° C. × 168 h | X | |
| | LOW SEC. | 50 | | H_HUM. 60° C. · 90% RH × 168 h | ○ | |
| 3 | UP SEC. | 175 | X | H_TEMP. 85° C. × 168 h | ○ | X |
| | MID SEC. | 150 | | L_TEMP. −40° C. × 168 h | ○ | |
| | LOW SEC. | 133 | | H_HUM. 60° C. · 90% RH × 168 h | Δ | |
| 4 | UP SEC. | 75 | X | H_TEMP. 85° C. × 168 h | — | X |
| | MID SEC. | 75 | | L_TEMP. −40° C. × 168 h | — | |
| | LOW SEC. | 75 | | H_HUM. 60° C. · 90% RH × 168 h | — | |
| 5 | UP SEC. | 100 | X | H_TEMP. 85° C. × 168 h | — | X |
| | MID SEC. | 350 | | L_TEMP. −40° C. × 168 h | — | |
| | LOW SEC. | 225 | | H_HUM. 60° C. · 90% RH × 168 h | — | |
| 6 | UP SEC. | 75 | X | H_TEMP. 85° C. × 168 h | — | X |
| | MID SEC. | 75 | | L_TEMP. −40° C. × 168 h | — | |
| | LOW SEC. | 100 | | H_HUM. 60° C. · 90% RH × 168 h | — | |

TABLE 4-continued

| COMPARATIVE EXAMPLE No. | FRICTION AND ABRASION TEST | | | RELIABILITY TEST | | COMPREHENSIVE EVALUATION |
|---|---|---|---|---|---|---|
| | FRICTION AND ABRASION LOAD (g) (Average) | | JUDGMENT | TEST CONDITION | JUDGMENT | |
| 7 | UP SEC. | 75 | X | H_TEMP. 85° C. × 168 h | — | X |
| | MID SEC. | 0 | | L_TEMP. −40° C. × 168 h | — | |
| | LOW SEC. | 25 | | H_HUM. 60° C. · 90% RH × 168 h | — | |
| 8 | UP SEC. | 125 | X | H_TEMP. 85° C. × 168 h | — | X |
| | MID SEC. | 75 | | L_TEMP. −40° C. × 168 h | — | |
| | LOW SEC. | 175 | | H_HUM. 60° C. · 90% RH × 168 h | — | |
| 9 | UP SEC. | 175 | X | H_TEMP. 85° C. × 168 h | ○ | X |
| | MID SEC. | 175 | | L_TEMP. −40° C. × 168 h | ○ | |
| | LOW SEC. | 175 | | H_HUM. 60° C. · 90% RH × 168 h | ○ | |
| 10 | UP SEC. | 75 | X | H_TEMP. 85° C. × 168 h | ○ | X |
| | MID SEC. | 94 | | L_TEMP. −40° C. × 168 h | ○ | |
| | LOW SEC. | 106 | | H_HUM. 60° C. · 90% RH × 168 h | ○ | |
| 11 | UP SEC. | 119 | X | H_TEMP. 85° C. × 168 h | ○ | X |
| | MID SEC. | 156 | | L_TEMP. −40° C. × 168 h | ○ | |
| | LOW SEC. | 144 | | H_HUM. 60° C. · 90% RH × 168 h | ○ | |
| 12 | UP SEC. | 200 | X | H_TEMP. 85° C. × 168 h | — | X |
| | MID SEC. | 150 | | L_TEMP. −40° C. × 168 h | — | |
| | LOW SEC. | 200 | | H_HUM. 60° C. · 90% RH × 168 h | — | |

UP SEC.: UPPER SECTION
MID SEC.: MIDDLE SECTION
LOW SEC.: LOWER SECTION
H_TEMP.: HIGH TEMPERATURE
L_TEMP.: LOW TEMPERATURE
H_HUM.: HIGH HUMIDITY

<Friction and Abrasion Test>

The friction and abrasion test was conducted by rubbing the surface of the antireflection coating 4b with a cotton bud in which a small amount of IPA (Isopropyl Alcohol) is contained, and by evaluating the abrasion load of the antireflection coating 4b. Specifically, the abrasion load was evaluated by increasing the load being applied at intervals of 25 g within a range of 50 g to 500 g and by rubbing the surface of the antireflection coating 4b 10 times at each load. The maximum load at which the abrasion of the antireflection coating 4b did not occur was determined as the friction and abrasion load, and when the abrasion did not occur even if the load was increased to 500 g, the friction and abrasion load was evaluated as 500 g. Since, in parts of the comparison examples, the abrasion occurred at a smaller load than expected, in such a case the evaluation was conducted by increasing the load at intervals of 1 g. The friction and abrasion test was conducted by placing, for each of the examples and comparison examples, a plurality of optical components 10 in each of an upper section, a middle section and a lower section in the chamber of the vacuum deposition apparatus. The judgment was conducted by obtaining the average of the friction and abrasion loads for each of the upper, middle and lower sections. Specifically, when the friction and abrasion load is 200 g or more in all of the upper, middle and lower sections, the test is judged to be "pass" ("O": more than practical level). When one of the friction and abrasion loads in the upper, middle and lower sections is less than 200 g, the test is judged to be "the level of manufacturable" ("Δ": almost the practical level). When the friction and abrasion loads of two or more of the upper, middle and lower sections are less than 200 g, the test is judged to be "fail" ("x": not reaching the practical level). The friction and abrasion test was conducted by using the optical components 10 of the examples and the comparative examples after elapsing of one week from the time of film formation of the optical components 10.

<Reliability Test>

In the reliability test, the high temperature test, the low temperature test and the high humidity/temperature test were conducted for the optical component 10, and the outer appearances of the antireflection coatings 4b of the examples and the comparative examples were observed and evaluated. In the high temperature test, the optical component 10 of each of the examples and comparative examples was placed for 168 hours in the environmental condition of temperature of 85° C., and thereafter the outer appearance of the antireflection coating 4b was observed by placing the optical component 10 in the room temperature condition. In the low temperature test, the optical component 10 was placed for 168 hours in the environmental condition of temperature of −40° C., and thereafter the outer appearance of the antireflection coating 4b was observed by placing the optical component 10 in the room temperature condition. In the high humidity/temperature test, the optical component 10 was placed for 168 hours in the environmental condition of temperature of 60° C. and humidity of 90%, and thereafter the outer appearance of the antireflection coating 4b was observed by placing the optical component 10 in the room temperature condition. For each test, the test is judged to be "pass" ("O": more than practical level) when no crack and abrasion is observed, the test is judged to be "the level of manufacturable" ("Δ": almost the practical level) when a small amount of crack or abrasion is observed in parts of samples but is practically permissible level, and the test is judged to be "fail" ("x": not reaching the practical level) when an apparent crack or abrasion is observed. It should be noted that, for the comparative examples 4 to 8 and 12, the reliability test was not conducted because the friction and abrasion test was judged to be fail for these comparative examples.

<Comprehensive Evaluation>

The comprehensive evaluation was conducted based on the above described friction and abrasion test and the reliability test. Specifically, the comprehensive evaluation was judged to be "fail" ("x": not reaching the practical level) when one of the friction and abrasion test and the reliability test was judged to be "fail" ("x": not reaching the practical level), and the comprehensive evaluation was judged to be "pass" ("O": more than practical level) when none of the tests was judged to be "fail".

From Table 3, it is understood that each of the examples 1 to 31 excels in the adhesiveness, abrasion resistance and chemical resistance, and these properties are not deteriorated largely even in the case of the strict environmental condition, such as the high temperature condition, the low temperature condition and the high humidity/temperature condition. From the comparison between the examples 1 to 31 and the comparative examples 1 to 12, it is understood that the advantages arise from the configuration of the silicon oxide thin films constituting the undercoating 4a (40a). This fact is considered in detail below.

<Consideration>

First, by comparison between the examples 1 to 31 and the comparative examples 1 to 3 and 9, it is understood that it is effective to form the whole undercoating 4a (40a) with an odd number of silicon oxide thin films, form the odd-numbered layers (i.e., the first, third and fifth layers counted from the base material 4) without introducing oxygen into the chamber, and form the even-numbered layers (i.e., the second and fourth layers counted from the base material 4) while introducing oxygen into the chamber.

From the comparison between the examples 1 to 5 and the comparative examples 4 and 5, it is understood that, when the undercoating is formed with three layers of silicon oxide thin films (i.e., in the case of the undercoating 4a) and the first layer and the third layer (i.e., the layer formed without introducing oxygen into the chamber) and the second (i.e., the layer formed while introducing oxygen into the chamber) are formed to have substantially the same film thickness, it is effective to form the undercoating 4a to have the total film thickness within the range of 160 nm to 270 nm (i.e., each thin film has the range of the film thickness of 53 nm to 90 nm).

From the comparison between the examples 6 to 11 and the comparative examples 6 to 8, it is understood that, when the undercoating is formed with three layers of silicon oxide thin films (i.e., in the case of the undercoating 4a) and the first layer and the third layer (i.e., the layer formed without introducing oxygen into the chamber) and the second (i.e., the layer formed while introducing oxygen into the chamber) are formed to have different film thicknesses, it is effective to form the film thicknesses of the first and third layers to be smaller than that of the second layer, form the undercoating 4a to have the total film thickness within the range of 120 nm to 270 nm, and form the second layer to have the film thickness within the range of 90 nm to 240 nm. It should be noted that, as shown in the examples 12 and 13, the film thicknesses of the first layer and the third layers are not necessarily required to be equal to each other, but, by considering the examples 1 to 5, it is concluded that, when the film thickness of the layer formed by introducing oxygen into the chamber (i.e., the second layer) is larger than or equal to the average film thickness of the layers formed without introducing oxygen into the chamber (i.e., the first and third layers), the same advantages can be obtained.

From the comparison between the example 9 and the comparative examples 5 and 8, it is concluded that, when the undercoating is formed with three layers of silicon oxide thin films (i.e., in the case of the undercoating 4a) and the total thicknesses the undercoating 4a are the same, the property becomes more excellent as the film thickness of the layer formed while introducing oxygen into the chamber (i.e., the second layer) becomes large.

From the comparison between the examples 14 to 20 and the comparative examples 9 and 10, it is understood that, when the undercoating is formed with five layers of silicon oxide thin films (i.e., in the case of the undercoating 40a) and the undercoating is formed with the layers having substantially the same film thicknesses, it is effective to form the undercoating 40a to have the total thickness within the range of 150 nm to 275 nm (i.e., to form each layer to have the film thickness within the range of 30 nm to 55 nm). It is also concluded that, by setting the flow rate of oxygen during film formation of the second and fourth layers to fall within the rage of $0.7 \times 10^{-2}$ Pa to $3.0 \times 10^{-2}$ Pa., the same advantages can be obtained.

From the comparison between the examples 21 to 29 and the comparative examples 11 and 12, it is understood that, when the undercoating is formed with five layers of silicon oxide thin films and the film thickness of the first, third and five layers (i.e., the layer formed without introducing oxygen into the chamber) is different from the film thickness of the second and fourth layers (i.e., the layer formed while introducing oxygen into the chamber), it is effective to set the film thickness of the first, third and fifth layers to be smaller than the film thickness of the second and fourth layers, set the total thickness of the undercoating 40a to fall within the range of 125 nm to 290 nm, and set the film thickness of the second and fourth layers to fall within the range of 30 nm to 120 nm. As shown in the examples 30 and 31, the thicknesses of the films may be different from each other. By considering the examples 14 to 20, when the average film thickness of the layers formed by introducing oxygen into the chamber (i.e., the second and fourth layers) is larger than equal to the average film thickness of the layers formed without introducing oxygen into the chamber (i.e., the first, third and fifth layers), the same advantages can be achieved.

From the comparison between the examples 28 to 31 and the comparative example 12, when the undercoating is formed with five layers of silicon oxide thin films (i.e., in the case of the undercoating 40a) and the total thicknesses of the undercoating 40a are the same, the property becomes more excellent as the average film thickness of the layers formed while introducing oxygen into the chamber (i.e., the second and fourth layers) increases.

The forging is the explanation for the embodiment. However, the present invention is not limited to the above described embodiment, but can be varied within the scope of the technical concept of the invention. For example, the collimator lens 3 and the objective lens 4 may be formed of a plurality of optical components.

In the above described embodiment and the examples, the configuration in which the antireflection coating 4b is deposited on the top surface of the undercoating 4a (40a) is explained. The present invention is not limited to the antireflection coating 4b, but a thin film having another functionality, such as an antistatic film, may be formed on the undercoating.

In the above described embodiment and the examples, the even-numbered layer of the undercoating 4a (40a) is formed while introducing oxygen into the chamber. However, the present invention is not limited to such a configuration. For example, the even-numbered layer may be formed by introducing mixture gas of oxygen and argon into the chamber.

This application claims priority of Japanese Patent Application No. P2011-188670, filed on Aug. 31, 2011. The entire subject matter of the application is incorporated herein by reference.

What is claimed is:

1. An optical component for an optical pick-up for converging a laser beam having a particular wavelength onto a recording layer of an optical disc, comprising:
a base material formed of a resin composition;
an undercoating formed of five layers of thin films having a same main constituent, the undercoating being formed on a top surface of the base material; and
a functional thin film formed on a top surface of the undercoating,
wherein:
each of a first layer, a third layer and a fifth layer of the undercoating is a thin film formed without introducing oxygen, and each of a second layer and a fourth layer is a thin film formed while introducing oxygen; and
a film thickness of the undercoating falls within a range of 150 nm to 275 nm, and film thicknesses of the thin films constituting the undercoating are substantially equal to each other.

2. An optical component for an optical pick-up for converging a laser beam having a particular wavelength onto a recording layer of an optical disc, comprising:
a base material formed of a resin composition;
an undercoating formed of five layers of thin films having a same main constituent, the undercoating being formed on a top surface of the base material; and
a functional thin film formed on a top surface of the undercoating,
wherein:
each of a first layer, a third layer and a fifth layer of the undercoating is a thin film formed without introducing oxygen, and each of a second layer and a fourth layer is a thin film formed while introducing oxygen; and
a film thickness of the undercoating falls within a range of 125 nm to 290 nm, and an average film thickness of the thin films of the second layer and the fourth layer falls within a range of 30 nm to 120 nm.

3. The optical component according to claim 2, wherein film thicknesses of the first, third and fifth layers are different from each other.

4. The optical component according to claim 2, wherein film thicknesses of the thin films of the second and fourth layers are different from each other.

5. The optical component according to claim 1, wherein the undercoating comprises a thin film including metal oxide as the same main constituent.

6. The optical component according to claim 5, wherein the metal oxide is silicon oxide.

7. The optical component according to claim 1, wherein the functional thin film is an antireflection coating.

8. The optical component according to claim 7, wherein the antireflection coating comprises a thin film of alumina and a thin film of a mixture of silicon oxide and aluminum.

9. An optical component for an optical pick-up for converging a laser beam having a particular wavelength onto a recording layer of an optical disc, comprising:
a base material formed of a resin composition;
an undercoating formed of three layers of thin films having a same main constituent, the undercoating being formed on a top surface of the base material; and
a functional thin film formed on a top surface of the undercoating,
wherein:
refractive indexes of thin films of a first layer and a third layer are larger than a refractive index of a thin film of a second layer; and
a film thickness of the undercoating falls within a range of 160 nm to 270 nm, and film thicknesses of the thin films constituting the undercoating are substantially equal to each other.

10. An optical component for an optical pick-up for converging a laser beam having a particular wavelength onto a recording layer of an optical disc, comprising:
a base material formed of a resin composition;
an undercoating formed of three layers of thin films having a same main constituent, the undercoating being formed on a top surface of the base material; and
a functional thin film formed on a top surface of the undercoating,
wherein:
refractive indexes of thin films of a first layer and a third layer are larger than a refractive index of a thin film of a second layer; and
a film thickness of the undercoating falls within a range of 120 nm to 270 nm, and a film thickness of the thin film of the second layer falls within a range of 90 nm to 240 nm.

11. The optical component according to claim 10, wherein film thicknesses of the first and third layers are different from each other.

12. The optical component according to claim 9, wherein a refractive index of the functional thin film is larger than the refractive indexes of the thin films of the first layer and the third layer.

13. The optical component according to claim 9, wherein the thin film of the second layer is a thin film formed by introducing oxygen at a flow rate of $0.7 \times 10^{-2}$ Pa to $3.0 \times 10^{-2}$ Pa.

14. An optical component for an optical pick-up for converging a laser beam having a particular wavelength onto a recording layer of an optical disc, comprising:
a base material formed of a resin composition;
an undercoating formed of five layers of thin films having a same main constituent, the undercoating being formed on a top surface of the base material; and
a functional thin film formed on a top surface of the undercoating,
wherein:
refractive indexes of thin films of a first layer, a third layer and a fifth are larger than refractive indexes of thin films of a second layer and a fourth layer; and
a film thickness of the undercoating falls within a range of 150 nm to 275 nm, and film thicknesses of the thin films constituting the undercoating are substantially equal to each other.

15. An optical component for an optical pick-up for converging a laser beam having a particular wavelength onto a recording layer of an optical disc, comprising:
a base material formed of a resin composition;
an undercoating formed of five layers of thin films having a same main constituent, the undercoating being formed on a top surface of the base material; and
a functional thin film formed on a top surface of the undercoating,
wherein:
refractive indexes of thin films of a first layer, a third layer and a fifth are larger than refractive indexes of thin films of a second layer and a fourth layer; and a film thickness of the undercoating falls within a range of 125 nm to 290 nm, and an average film thickness of the thin films of the second layer and the fourth layer falls within a range of 30 nm to 120 nm.

16. The optical component according to claim 15, wherein film thicknesses of the first, third and fifth layers are different from each other.

17. The optical component according to claim 15, wherein film thicknesses of the second and fourth layers are different from each other.

18. The optical component according to claim 14, wherein a refractive index of the functional thin film is larger than the refractive indexes of the first, third and fifth layers.

19. The optical component according to claim 14, wherein the thin films of the second and fourth layers are thin films formed by introducing oxygen at a flow rate of $0.7 \times 10^{-2}$ Pa to $3.0 \times 10^{-2}$ Pa.

20. The optical component according to claim 9, wherein the undercoating comprises a thin film including metal oxide as the same main constituent.

21. The optical component according to claim 20, wherein the metal oxide is silicon oxide.

22. An optical pick-up device, comprising:
an optical component according to claim 1; and
a light source that emits, toward the optical component, monochromatic light having a particular wavelength falling within a range of 400 to 410 nm.

23. An optical pick-up device, comprising:
an optical component according to claim 2; and
a light source that emits, toward the optical component, monochromatic light having a particular wavelength falling within a range of 400 to 410 nm.

24. An optical pick-up device, comprising:
an optical component according to claim 9; and
a light source that emits, toward the optical component, monochromatic light having a particular wavelength falling within a range of 400 to 410 nm.

25. An optical pick-up device, comprising:
an optical component according to claim 10; and
a light source that emits, toward the optical component, monochromatic light having a particular wavelength falling within a range of 400 to 410 nm.

26. An optical pick-up device, comprising:
an optical component according to claim 14; and
a light source that emits, toward the optical component, monochromatic light having a particular wavelength falling within a range of 400 to 410 nm.

27. An optical pick-up device, comprising:
an optical component according to claim 15; and
a light source that emits, toward the optical component, monochromatic light having a particular wavelength falling within a range of 400 to 410 nm.

28. The optical component according to claim 1, wherein the base material is made of cycloolefin resin.

* * * * *